United States Patent
Mortensen

(10) Patent No.: US 8,909,413 B2
(45) Date of Patent: Dec. 9, 2014

(54) METHODS AND SYSTEMS FOR CONTROLLING ON-BOARD DIAGNOSTICS

(75) Inventor: Anthony P. Mortensen, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 769 days.

(21) Appl. No.: 12/889,795

(22) Filed: Sep. 24, 2010

(65) Prior Publication Data

US 2012/0078460 A1    Mar. 29, 2012

(51) Int. Cl.
*G06F 11/30*   (2006.01)
*F02D 41/14*   (2006.01)
*F02D 41/22*   (2006.01)

(52) U.S. Cl.
CPC ........... *F02D 41/1495* (2013.01); *F02D 41/22* (2013.01); *F02D 2200/023* (2013.01); *Y02T 10/40* (2013.01)
USPC ....... 701/29.8; 701/29.1; 701/29.9; 701/30.8; 701/30.9; 701/31.1; 701/103; 701/104; 701/109; 701/113; 701/123; 73/114.55; 123/479; 123/480; 123/688; 123/690; 324/503

(58) Field of Classification Search
None
See application file for complete search history.

(56) References Cited

U.S. PATENT DOCUMENTS

| | | | |
|---|---|---|---|
| 5,178,121 A * | 1/1993 | Kitajima et al. | 123/689 |
| 5,230,322 A * | 7/1993 | Curran et al. | 123/694 |
| 5,331,940 A * | 7/1994 | Takayama | 123/679 |
| 5,520,162 A * | 5/1996 | Rotramel et al. | 123/689 |
| 5,671,141 A * | 9/1997 | Smith et al. | 701/33.6 |
| 5,868,117 A * | 2/1999 | Moote et al. | 123/486 |
| 5,881,703 A * | 3/1999 | Nankee et al. | 123/686 |
| 5,928,303 A * | 7/1999 | Sakai | 701/109 |
| 5,937,798 A * | 8/1999 | Cheng et al. | 123/1 A |
| 5,947,089 A * | 9/1999 | Joyce et al. | 123/479 |
| 6,000,367 A * | 12/1999 | Huff et al. | 123/1 A |
| 6,023,965 A * | 2/2000 | Kennie et al. | 73/114.38 |
| 6,092,019 A * | 7/2000 | Aihara | 701/113 |
| 6,389,874 B1 * | 5/2002 | Huff et al. | 73/1.02 |
| 6,966,304 B2 * | 11/2005 | Nagaishi et al. | 123/480 |
| 7,536,244 B2 * | 5/2009 | Kunihiro et al. | 701/31.1 |
| 7,707,821 B1 * | 5/2010 | Legare | 60/277 |
| 7,774,130 B2 * | 8/2010 | Pepper | 701/123 |
| 7,886,523 B1 * | 2/2011 | Legare | 60/285 |

(Continued)

FOREIGN PATENT DOCUMENTS

| | | |
|---|---|---|
| EP | 1710419 | 10/2009 |
| JP | 2007127076 | 5/2007 |
| JP | 2009138571 | 6/2009 |
| WO | WO2009068770 | 6/2009 |

*Primary Examiner* — Khoi Tran
*Assistant Examiner* — Jonathan L Sample
(74) *Attorney, Agent, or Firm* — Plumsea Law Group, LLC

(57) ABSTRACT

Embodiments provide systems and methods for using a feedback correction factor to determine whether a motor vehicle should be placed in a judging or non-judging mode regarding the on-board diagnostic system. If the feedback correction factor is within a predetermined range, the vehicle is placed in a judging mode. If the feedback correction factor is outside a predetermined range, the vehicle is placed in a non-judging mode. Methods and systems for using an engine oil temperature to determine whether a motor vehicle should be placed in a judging or non-judging mode regarding the on-board diagnostic system are disclosed. If an engine oil temperature, or predicted engine oil temperature, is below a predetermined temperature, the motor vehicle is placed in a non-judging mode. If an engine oil temperature, or predicted engine oil temperature, is above a predetermined temperature, the motor vehicle is placed in a judging mode.

20 Claims, 14 Drawing Sheets

(56) References Cited

U.S. PATENT DOCUMENTS

| | | | |
|---|---|---|---|
| 7,899,608 B1* | 3/2011 | Pederson et al. | 701/111 |
| 8,190,351 B2* | 5/2012 | Fukuchi et al. | 701/114 |
| 2002/0038647 A1* | 4/2002 | Tashiro et al. | 123/350 |
| 2003/0131593 A1* | 7/2003 | Asanuma | 60/297 |
| 2003/0172908 A1* | 9/2003 | Russell | 123/406.47 |
| 2004/0040282 A1* | 3/2004 | Zhu | 60/276 |
| 2004/0238378 A1* | 12/2004 | Kumazawa et al. | 205/781 |
| 2005/0131601 A1* | 6/2005 | Kunihiro et al. | 701/34 |
| 2005/0205044 A1* | 9/2005 | Lewis et al. | 123/198 F |
| 2007/0088487 A1* | 4/2007 | Lahti et al. | 701/104 |
| 2007/0129878 A1* | 6/2007 | Pepper | 701/123 |
| 2008/0115486 A1* | 5/2008 | Yurgil | 60/277 |
| 2009/0064970 A1* | 3/2009 | Porten et al. | 123/406.19 |
| 2009/0133678 A1* | 5/2009 | Mallebrein et al. | 123/679 |
| 2009/0150019 A1* | 6/2009 | Sakamoto et al. | 701/29 |
| 2009/0306846 A1* | 12/2009 | Jeong | 701/29 |
| 2010/0017098 A1* | 1/2010 | Fukuchi et al. | 701/103 |
| 2010/0223910 A1* | 9/2010 | Funk et al. | 60/277 |

* cited by examiner

METHODS AND SYSTEMS FOR CONTROLLING ON-BOARD DIAGNOSTICS

FIELD OF THE INVENTION

The current embodiments relate to the field of motor vehicles. More specifically, the current embodiments relate to improving the accuracy of the on-board diagnostic system in motor vehicles.

BACKGROUND

Growing environmental concerns about pollution and air quality have increased the emphasis on the amount of pollutants in motor vehicle emissions.

For example, most vehicles now include a monitoring system called an on-board diagnostic system. The on-board diagnostic system monitors the performance of some of a motor vehicle's major components, including those responsible for controlling emissions. The Environmental Protection Agency (EPA) requires all cars to be manufactured with an on-board diagnostic system. One of the purposes of the on-board diagnostic system is to alert the operator when an engine condition exists that requires immediate attention. For example, if the on-board diagnostic system detects that the exhaust from the motor vehicle is exceeding emission standards, it will initiate an alarm by lighting up a malfunction indicator light. The operator can then take the motor vehicle to a service station in order to determine the cause of the problem.

The use of alternative fuels is also being explored to improve the environmental air quality. For example, ethanol fuel (E85) has a higher octane rating than conventional methanol gasoline, which means that ethanol fuel burns more efficiently and more cleanly. However, it is difficult to start engines using ethanol fuel at cold temperatures. This problem can be overcome by injecting extra ethanol fuel into the engine during startup. However, this extra fuel will carry over into the engine's exhaust and may cause the engine's on-board detection system to light up the malfunction indicator light on the dashboard.

It is impractical for the on-board diagnostic system to indicate a malfunction each time the motor vehicle starts in cold temperatures.

SUMMARY

Embodiments for systems and methods for controlling a motor vehicle are provided. One method includes the steps of determining a feedback correction factor and retrieving a predetermined range associated with the feedback correction factor. The method further includes steps of entering a judging mode if the feedback correction factor is within the predetermined range, where the judging mode includes judging at least one on-board diagnostic item, and entering a non-judging mode if the feedback correction factor is outside the predetermined range, where the non-judging mode includes ignoring at least one on-board diagnostic item.

One method includes the steps of receiving information from at least one sensor, determining a current engine oil temperature and retrieving a predetermined temperature. The method further includes steps of entering a judging mode if the engine oil temperature is below the predetermined temperature, where the judging mode includes judging at least one on-board diagnostic item, and entering a non-judging mode if the engine oil temperature is above the predetermined temperature, where the non-judging mode includes ignoring at least one on-board diagnostic item.

One system includes an electronic control unit, at least one sensor electronically connected to the control unit, where the sensor is capable of sending at least one signal to the electronic control unit. The system further includes an on-board diagnostic system electronically connected to the electronic control unit, where the electronic control unit evaluates a signal received from the sensor. In addition, the judgments of at least one on-board diagnostic item are prohibited based on the evaluation of the electronic control unit.

Other systems, methods, features and advantages of the embodiments described herein will be, or will become, apparent to one of ordinary skill in the art upon examination of the following figures and detailed description. It is intended that all such additional systems, methods, features and advantages included within this description and this summary, be within the scope of the current embodiments, and be protected by the following claims.

BRIEF DESCRIPTION OF THE DRAWINGS

The current embodiments can be better understood with reference to the following drawings and description. The components in the figures are not necessarily to scale, emphasis instead being placed upon illustrating the principles of the current embodiments. Moreover, in the figures, like reference numerals designate corresponding parts throughout the different views.

DETAILED DESCRIPTION

Figure 1:
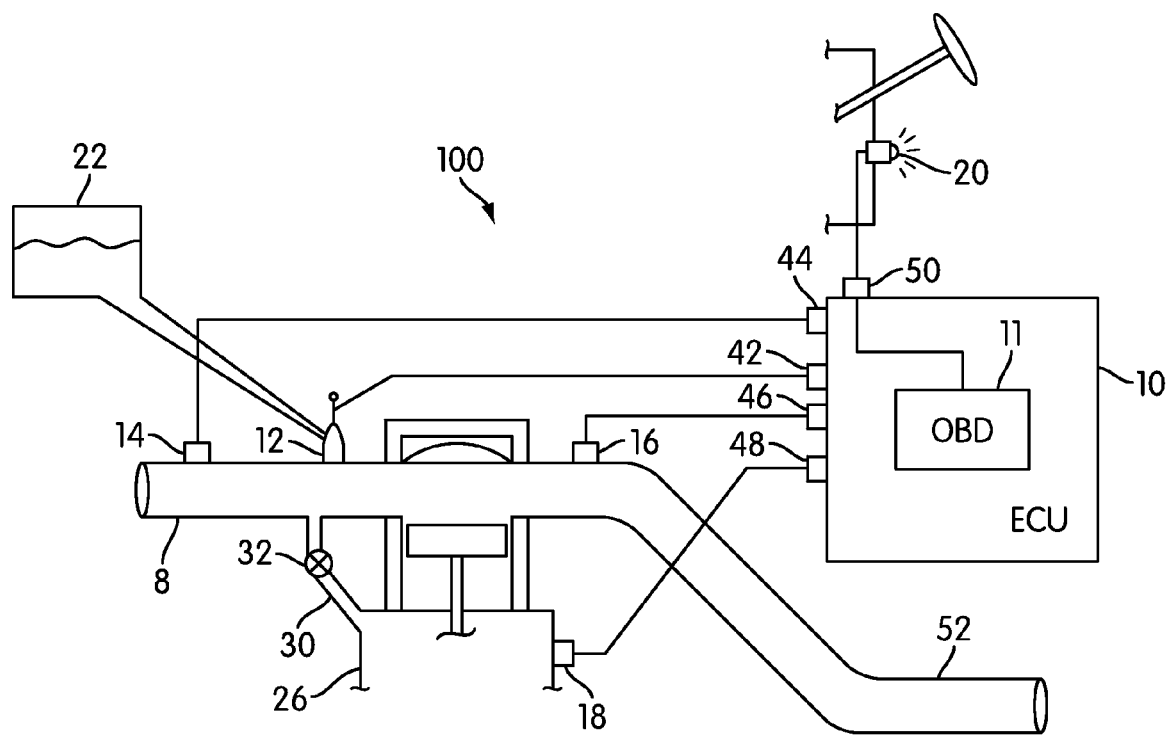
FIG. 1 is a schematic view of various sensors and electrical components of a motor vehicle relevant to certain embodiments.

FIG. 1 is a schematic view of various sensors and electrical components of a motor vehicle 100 according to one embodiment. The terms "motor vehicle" and "vehicle," as used throughout the specification and claims, refers to any moving vehicle that is capable of carrying one or more human occupants and is powered by any form of energy. The terms "motor vehicle" and "vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, only some components of motor vehicle 100 are shown in the current embodiment. Furthermore, it will be understood that in other embodiments some of the components may be optional. Additionally, it will be understood that in other embodiments, any other arrangements of the components illustrated here can be used for powering motor vehicle 100.

For purposes of illustration, some components of motor vehicle 100 are shown schematically in this embodiment. In one embodiment, motor vehicle 100 can include an engine 26. For purposes of clarity, only a portion of an engine 26 is shown in the current embodiment. In particular, a single cylinder engine 26 is shown. It will be understood, however, that in other embodiments, engine 26 could include any number of cylinders.

In some cases, the engine 26 may be configured to operate using various types of mixed fuels. The term "mixed fuel" as used throughout this detailed description and in the claims applies to a mixture of two or more fuels. For example, in some cases, a mixed fuel may be a mixture of gasoline and ethanol. Generally, mixtures of gasoline and ethanol can include different proportions of ethanol including, but not limited to: E20, E75, E80 and E85. In other cases, other types of mixed fuels can be used including, but not limited to: methanol and gasoline mixtures, p-series fuels as well as other mixed fuels. In some cases, gasoline without ethanol may be referred to as E0 fuel.

As can be seen in FIG. 1, vehicle 100 includes a gas tank 22 that is connected to fuel injector 12. Fuel injector 12 injects fuel into a piston chamber of engine 26 in order to promote combustion. Once combustion occurs, exhaust is removed from the engine 26 and eventually is expelled by way of the tailpipe 52.

Motor vehicle 100 may include provisions for communicating, and in some cases controlling, the various components associated with the motor vehicle 100. In some embodiments, the motor vehicle 100 may be associated with a computer or similar device. In the current embodiment, the motor vehicle 100 may include an electronic control unit 10. In one embodiment, the electronic control unit 10 may be configured to communicate with, and/or control, various components of the motor vehicle 100. In addition, in some embodiments, the electronic control unit 10 may be configured to control additional components that are not shown.

The electronic control unit 10 may include a microprocessor, RAM, ROM, and software all serving to monitor and supervise various parameters of the engine, as well as other components or systems of the motor vehicle 100. For example, the electronic control unit 10 is capable of receiving signals from numerous sensors located in the engine. The output of various sensors is sent to the electronic control unit 10 where the sensor signals may be stored in an electronic storage, such as RAM. Both current and electronically stored sensor signals may be processed by the central processing unit (CPU) in accordance with software stored in an electronic memory, such as ROM.

Motor vehicle 100 may include an on-board diagnostic system 11. The on-board diagnostic system 11 may make up part of the electronic control unit 10 as shown in FIG. 1. Alternatively, the on-board diagnostic system 11 may be separate and independent from the electronic control unit 10 and have its own microprocessor, RAM, ROM, software and other components.

Motor vehicle 100 can include provisions for monitoring various operating parameters of an engine and/or other systems. For example, the electronic control unit 10 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with the electronic control unit 10 are optional. Some embodiments may include a given port or provision, while others may exclude it. The following description discloses many of the possible ports and provisions that can be used. However, it should be kept in mind that not every part or provision must be used or included in a given embodiment.

The electronic control unit 10 may control the fuel that flows into engine 26 by sending an electronic signal to the fuel injector 12 thereby mechanically opening and closing it. Opening the fuel injector 12 may allow fuel to flow from the gas tank 22 to the combustion chamber in the engine 26.

In some embodiments, the electronic control unit 10 may include port 42 for communicating with and/or controlling the fuel injector 12. Fuel injector 12 could be any type of fuel injector that is configured to inject fuel into one or more cylinder(s) of an engine 26. Moreover, fuel injector 12 may further be associated with other components of a fuel injection system including rails, fuel pumps, fuel pressure regulators as well as various sensors, which are not shown here for purposes of clarity. For purposes of illustration, one fuel injector is illustrated in the current embodiment, however in other embodiments any number of fuel injectors may be used with engine 26.

Although a single port is shown for communicating with the fuel injector 12, in other embodiments, multiple ports could be used so that each fuel injector communicates with the electronic control unit 10 using a separate port. Moreover, in other embodiments additional ports could be provided for communicating with other components or systems associated with the engine 26 including, but not limited to: spark plugs, electronically controlled valves, an electronically controlled throttle as well as other systems utilized for the operation of engine 26.

In some embodiments, the electronic control unit 10 can include provisions for receiving air flow information. In some cases, the electronic control unit 10 may include port 44 for receiving information from an air flow meter 14 mounted on the intake manifold 8 of the engine 26. Although the current embodiment shows air flow meter 14 in the intake manifold 8 of the engine 26, air flow meter 14 may be positioned in other locations throughout the engine. In other embodiments, the electronic control unit 10 can include provisions for receiving information relating to the rate of air flow through the engine by any device or method known in the art.

In some embodiments, the vehicle 100 may include provisions for sensing properties of a fuel used to run engine 26. Some embodiments may include an oxygen sensor 16 which may be configured to provide feedback about the fuel content in an air/fuel mixture associated with the engine 26. In some cases, the electronic control unit 10 may receive fuel content information from an oxygen sensor 16 through port 46. In other cases, fuel content information can be determined using another kind of sensor, including any other kind of oxygen sensor, such as a linear air/fuel sensor. Moreover, in some cases, multiple oxygen sensors could be used, with different sensors located in different portions of an exhaust system. The electronic control unit 10 may also include provisions for receiving information from other types of sensors, such as carbon dioxide, hydrogen, or nitrogen sensors.

In some embodiments, the electronic control unit 10 may include provisions for receiving oil temperature information. In some cases, the electronic control unit 10 may include port 48 for receiving information relating to the temperature of the engine oil from an engine oil temperature sensor 18. Although the current embodiment shows the engine oil temperature sensor 18 on the engine 26, the engine oil temperature sensor 18 may be located throughout any portion of the vehicle 100 so as to accurately provide the engine oil temperature information for the electronic control unit 10.

In some embodiments, the electronic control unit 10 may include provisions for alerting a user about potential diagnostic issues. In some embodiments, the electronic control unit 10 may be electronically connected to a malfunction indicator 20 mounted on the dashboard of vehicle 100. The term "malfunction indicator" as used throughout this detailed description and in the claims refers to any visual, audible and/or tactile indicator that may be used to alert a user about a potential issue associated with an on-board diagnostic system. In one embodiment, malfunction indicator 20 may be lamp or other type of visual indicator.

In some embodiments, the malfunction indicator 20 may be electronically connected to the electronic control unit 10 by way of port 50. Although the current embodiment shows the malfunction indicator 20 mounted on the dashboard, the malfunction indicator 20 may also be mounted in any location that is visible or audible to the operator. However, in some embodiments the malfunction indicator 20 may not be visible to the operator. In some embodiments, the malfunction indicator 20 may be an engine symbol which is lit up when activated. In other embodiments, the malfunction indicator 20 may read "trouble," "engine," "check engine," "service engine soon," "check engine soon," or some other verbal warning. In some embodiments, the light behind the symbol may blink on and off. In other embodiments, the light behind the symbol will be steady. Other embodiments may include various stages, such as steady and/or flashing lights. In some embodiments, the electronic control unit 10 records the condition which caused the malfunction indicator 20 to activate. In some embodiments, the operator can access the electronic control unit 10 to determine what caused the malfunction indicator 20 to activate. In other embodiments, the operator must bring the vehicle to a service facility that has the proper equipment to determine what caused the indicator 20 to activate. In some embodiments the malfunction indicator 20 may stay lit once it is activated, and must be brought to a service station in order for it to be cleared. In other embodiments, the malfunction indicator 20 may deactivate once the condition that cause its activation clears.

Figure 2:
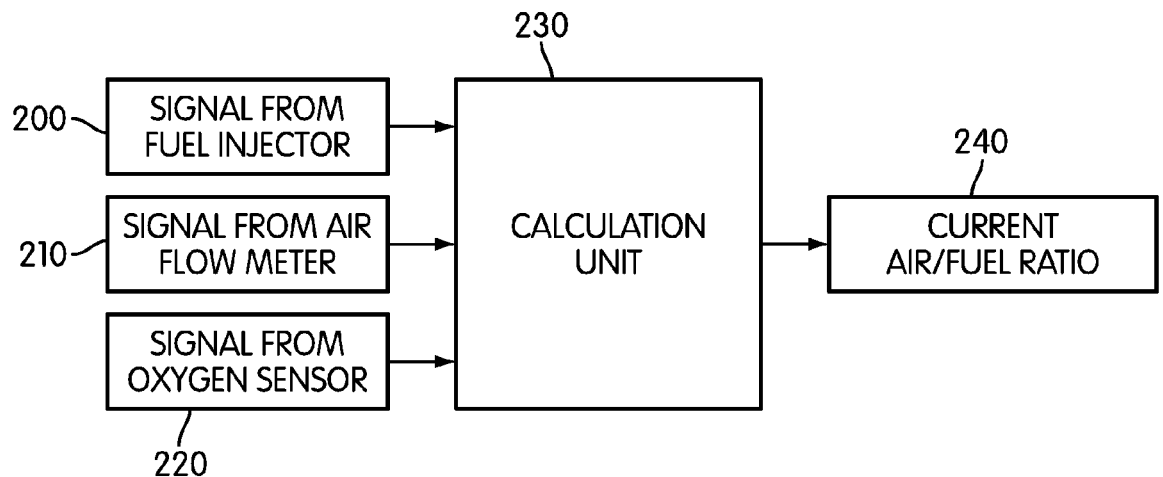
FIG. 2 is a schematic view of an embodiment of a calculation unit for determining an air/fuel ratio.
Figure 3:
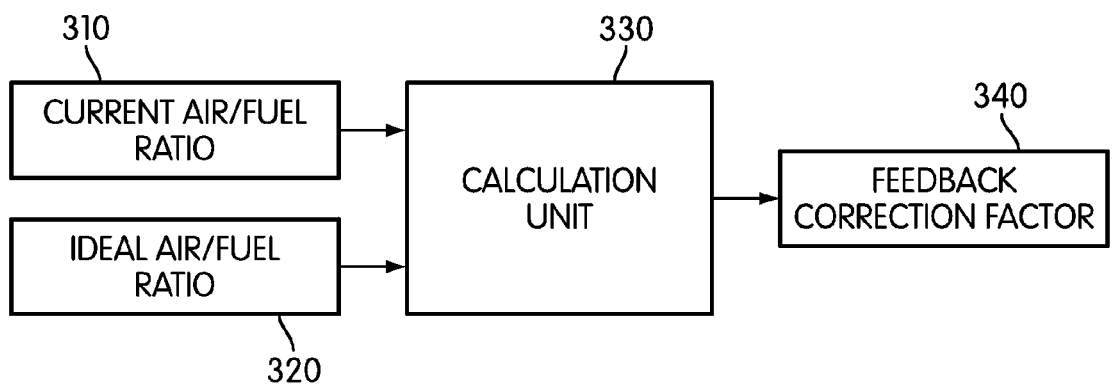
FIG. 3 is a schematic view of an embodiment of a calculation unit for determining a feedback correction factor.
Figure 4:
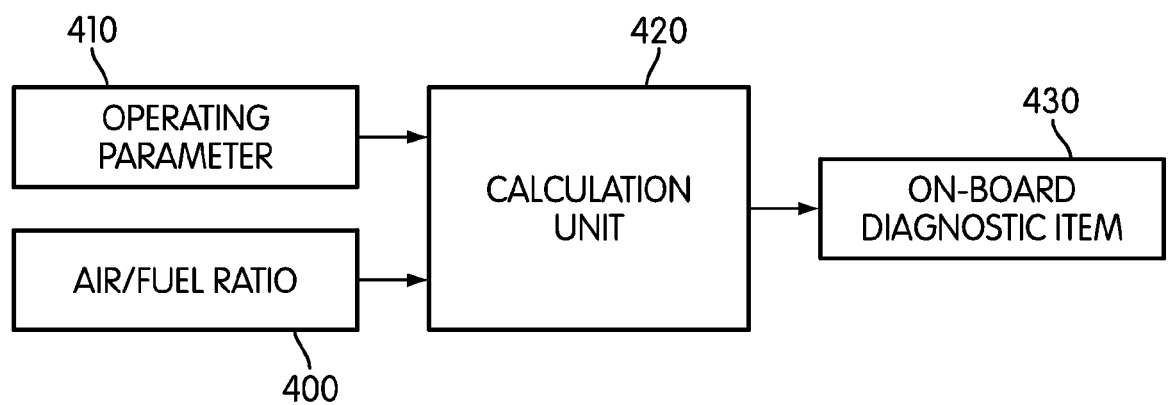
FIG. 4 is a schematic view of an embodiment of a calculation unit for determining an on-board diagnostic item.

FIGS. 2 through 4 illustrate the relationships between various operating parameters used to control engine 26. FIG. 2 shows one embodiment where information obtained from sensors is used to determine the engine's current air/fuel ratio. FIG. 2 shows a calculation unit 230 which may be a microprocessor or other computing means. In some embodiments, the calculation unit 230 is the electronic control unit. In some embodiments, the calculation unit 230 is the on-board diagnostic system. In some embodiments, the calculation unit 230 may be wholly or partially located in the electronic control unit and/or the on-board diagnostic system. In some embodiments, the calculation unit 230 may be independent from the electronic control unit and/or the on-board diagnostic system.

As can be seen in FIG. 2, the calculation unit 230 may receive a signal 200 from a fuel injector. Although only one signal 200 from a fuel injector is shown in FIG. 2, more than one signal from one or more fuel injectors may also be sent to the calculation unit 230. In some embodiments, a calculation unit 230 may receive a signal 210 from an air flow meter. Although only one signal from an air flow meter is shown in FIG. 2, more than one signal from one or more air flow meters may also be sent to the calculation unit 230. In some embodiments, a calculation unit 230 may receive a signal 220 from an oxygen sensor. Although only one signal from an oxygen sensor is shown in FIG. 2, more than one signal from one or more oxygen sensors may also be sent to the calculation unit 230. Other sensors measuring exhaust gases may also be used, such as sensors detecting carbon dioxide, hydrogen, nitrogen, or other exhaust gases.

The calculation unit 230 uses signals from various sensors to calculate the current air/fuel ratio 240 of the vehicle. In one embodiment, signals 220 sent by the oxygen sensor may indicate the amount of oxygen in the exhaust. In some embodiments, signals 210 sent by an air flow meter may indicate the amount of air entering the engine. In some embodiments, signals 200 sent by a fuel injector may indicate the amount of fuel entering the engine.

In one embodiment, the calculation unit 230 can determine the current air/fuel ratio by dividing the mass flow rate of air through the engine by the mass flow rate of fuel through the engine. One skilled in the art would recognize that there are other methods of determining the air/fuel ratio of the vehicle using the sensor signals shown in FIG. 2.

FIG. 3 shows one embodiment where a calculation unit 330 determines an air/fuel feedback correction factor, also hereby referred to as the feedback correction factor. The feedback correction factor is associated with a correction to the current air/fuel ratio necessary to achieve a target air/fuel ratio. As shown in FIG. 3, the calculation unit 330 uses the current air/fuel ratio 310, as well as the ideal air/fuel ratio 320, to determine the feedback correction factor 340. The current air/fuel ratio 310 may be determined as described in FIG. 2. The ideal air/fuel ratio 320 of an engine is the ideal ratio of air to fuel that would theoretically allow that particular engine to completely burn all the fuel and air with no excess left over. The ideal air/fuel ratio 320 may be predetermined for a particular class of vehicle, or it may be customized for each individual engine. Also, the ideal air/fuel ratio 320 may be continuously calculated throughout the lifetime of the engine to take into account changes in parameters due to the wear of parts. The ideal air/fuel ratio 320 may be stored in electronic memory, and may be retrieved by the calculation unit 330.

In one embodiment, the calculation unit 330 may determine the feedback correction factor 340 by dividing the current air/fuel ratio 310 by the ideal air/fuel ratio 320. According to this embodiment, if the current air/fuel ratio is equal to the ideal air/fuel ratio, then the feedback correction factor is equal to one. If the current air/fuel ratio is less than the ideal air/fuel ratio, then the feedback correction factor is less than one. If the current air/fuel ratio is greater than the ideal air/fuel ratio, then the feedback correction factor is greater than one. In some embodiments, the feedback correction factor may be determined without using the current air/fuel ratio, and/or the ideal air/fuel ratio.

The calculation unit 330 may be a microprocessor or other computing means. In some embodiments, the calculation unit 330 is the electronic control unit. In some embodiments, the calculation unit 330 is the on-board diagnostic system. In some embodiments, the calculation unit 330 may be wholly or partially located in the electronic control unit and/or the on-board diagnostic system. In some embodiments, the calculation unit 330 may be independent from the electronic control unit and/or the on-board diagnostic system.

On-board diagnostic system 11 (see FIG. 1) may be associated with one or more on-board diagnostic items. The term "on-board diagnostic item" or just "diagnostic item" as used throughout this detailed description and in the claims refers to any operating parameter, variable, or any other item characterizing a condition of the vehicle that may be used by an on-board diagnostic unit for monitoring various vehicle systems. In some cases, an on-board diagnostic item may be a detected item. In other cases, an on-board diagnostic item may be a calculated item. In some cases, an on-board diagnostic item could indicate if a particular component or system is functioning properly. As an example, one or more on-board diagnostic items may be used to characterize the emissions of a vehicle. For example, an on-board diagnostic item may be a parameter used to indicate the level of one or more pollutants in the exhaust of a vehicle. If the on-board diagnostic item is higher than a predetermined threshold, the on-board diagnostic system may determine that there is a problem with the current vehicle emissions. It will be understood that on-board diagnostic items could be used for monitoring any vehicle systems. On-board diagnostic items may be determined using signals from fuel injectors, air/flow sensors, oxygen sensors, air flow meters, engine oil temperatures, engine coolant temperatures, as well as other sensors or devices. In some embodiments, the on-board diagnostic item is based on the air/fuel ratio.

FIG. 4 shows one embodiment where a calculation unit 420 determines an on-board diagnostic item 430. In some embodiments, the calculation unit 420 uses the air/fuel ratio 400 as input in order to determine the on-board diagnostic item 430. In other embodiments, additional operating parameters 410 may be input into the calculation unit 420 in order to determine the on-board diagnostic item 430. In some embodiments, operating parameters 410 may be associated with one or more vehicle sensors. In some embodiments, the electronic control unit and/or on-board diagnostic system may calculate or derive the operating parameters 410.

The calculation unit 420 may be a microprocessor or other computing means. In some embodiments, the calculation unit 420 is the electronic control unit. In some embodiments, the calculation unit 420 is the on-board diagnostic system. In some embodiments, the calculation unit 420 may be wholly or partially located in the electronic control unit and/or the on-board diagnostic system. In some embodiments, the calculation unit 420 may be independent from the electronic control unit and/or the on-board diagnostic system.

In some embodiments, an on-board diagnostic item may be associated with the malfunction indicator 20. In some cases, the malfunction indicator 20 may be activated if one or more on-board diagnostic items are found to be abnormal. For example, the on-board diagnostic system 11 may monitor signals it receives from oxygen sensor 16. If the on-board diagnostic system 11 receives a low oxygen signal from oxygen sensor 16, the on-board diagnostic system 11 may determine that the exhaust contains pollutants exceeding environmental limits. In some cases, the on-board diagnostic system 11 may activate the malfunction indicator 20 on the dashboard based on an abnormal on-board diagnostic item.

The positive crankcase ventilation system may also cause the malfunction indicator 20 to activate upon startup. Such a situation could occur for example, when mixed fuels or other types of fuels containing alcohol are used. Upon initial startup of vehicle 100, some of the alcohol contained in the fuel fails to vaporize due to the low engine temperature. The alcohol then leaks into the crankcase of the engine 26 and mixes with the engine oil. As the engine 26 heats up, the alcohol eventually vaporizes causing the engine oil to flow through the positive crankcase ventilation valve 32 by way of the ventilation piping 30 into the intake manifold 8. In addition, blow-by gas is also circulated through the ventilation piping 30 into the intake manifold 8. These factors cause the oxygen content of the exhaust gas to decrease, which is detected by oxygen sensor 16. If the on-board diagnostic system 11 receives a low oxygen signal from the oxygen sensor 16, the on-board diagnostic system 11 may determine there is a low air/fuel ratio and activate the malfunction indicator 20 on the dashboard based on an abnormal on-board diagnostic item.

A motor vehicle can include provisions for preventing excessive activation of a malfunction indicator. In some embodiments, a motor vehicle can determine if the judgments of an on-board diagnostic system should be trusted based on one or more operating conditions. For example, in situations where alcohol may vaporize and enter the crankcase during start-up, the calculated air/fuel ratio may not be accurate. Since the air/fuel ratio may be used to determine some on-board diagnostic items, this could lead to inaccurate values for one or more on-board diagnostic items. Therefore, it may be desirable to ignore the judgments of the on-board diagnostic system in operating conditions where the calculated air/fuel ratio may be inaccurate.

For purposes of clarity, the terms "judging mode" and "non-judging mode" are used with respect to the embodiments. The term "judging mode" refers to a mode in which on-board diagnostic items may be judged to determine if any diagnostic problems are occurring. In contrast, the term "non-judging mode" refers to a mode in which on-board diagnostic items are not judged to determine if any diagnostic problems are occurring. When a system is operating in the judging mode, one or more malfunction indicators can be activated if there are any diagnostic problems. However, in the non-judging mode the system may be prevented from activating some or all malfunction indicators, since it is determined that the diagnostic items may not be reliable.

In different embodiments, different operating conditions can be used to determine if a system should operate in the judging mode or the non-judging mode. In other words, different operating conditions can be used to determine if the on-board diagnostic items are reliable enough to indicate potential diagnostic issues. In some embodiments, a motor vehicle can use a feedback correction factor to determine if the on-board diagnostic items should be judged. In some embodiments, a motor vehicle can use the engine oil temperature to determine if the on-board diagnostic items are reliable. In some embodiments, a motor vehicle can use both a feedback correction factor and oil temperature to determine if the on-board diagnostic items are reliable.

Figure 5:
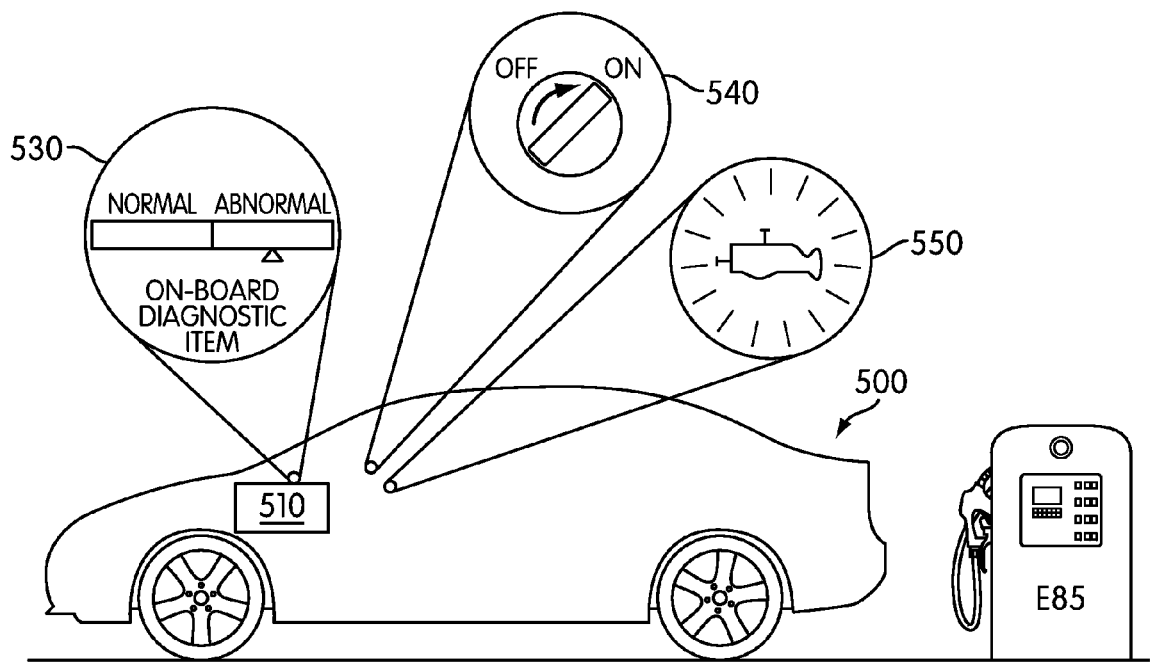
FIG. 5 is a schematic view of an embodiment of a vehicle during start up.

FIG. 5 shows a vehicle 500 that operates on ethanol (E85) fuel and that does not utilize a feedback correction factor for determining whether to judge the on-board diagnostic items. In this case, any abnormal on-board diagnostic item 530 may cause the malfunction indicator to be activated 550. For example, after the ignition switch is placed in the on position 540, a large amount of ethanol fuel (E85) is injected into the engine in order to startup the vehicle 500. This may cause the electronic control unit 510 to sense a large amount of unburned fuel in the exhaust, resulting in an abnormal on-board diagnostic item 530. Due to the abnormal on-board diagnostic item 530, the malfunction indicator 550 is activated. This arrangement can cause a user to be frustrated or confused since the malfunction indicator is activated 550 each time the ignition switch is placed in the on position 540.

Figure 6:
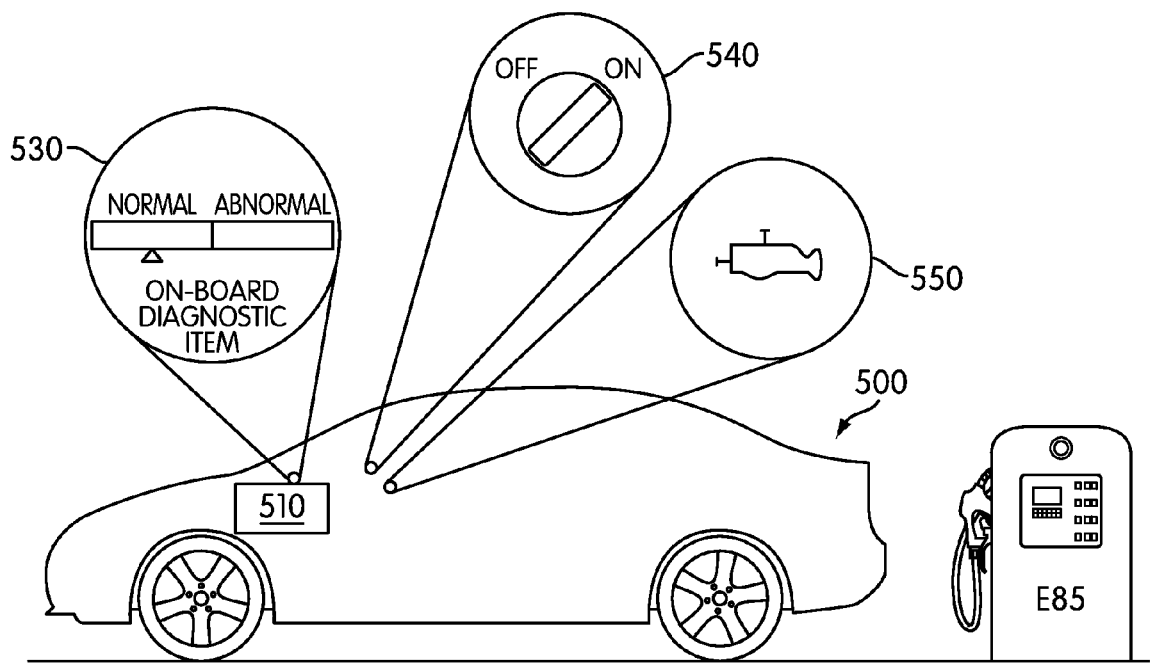
FIG. 6 is a schematic view of another embodiment of a vehicle during start up.

FIG. 6 shows an embodiment of a vehicle 500 at a time soon after the time illustrated in FIG. 5. At this time, the extra fuel (E85) circulating in the ventilation system during startup has burned off. The electronic control unit 510 does not sense extra fuel in the exhaust, resulting in a normal on-board diagnostic item 530. Since the on-board diagnostic item is normal 530, the malfunction indicator is not activated 550. If the operator received a malfunction indicator 550 warning each time the vehicle 500 was started up, the operator may be confused when the malfunction indicator is subsequently deactivated.

In some embodiments, the malfunction indicator may stay activated even after the condition causing its activation has cleared. In such a case, the operator may have to bring the vehicle 500 to a service station in order to have the malfunction indicator 550 warning cleared. Since the condition which caused the malfunction indicator 550 activation has cleared, the service station may be unable to determine what caused its activation. This may cause further operator confusion and frustration.

Figure 7:
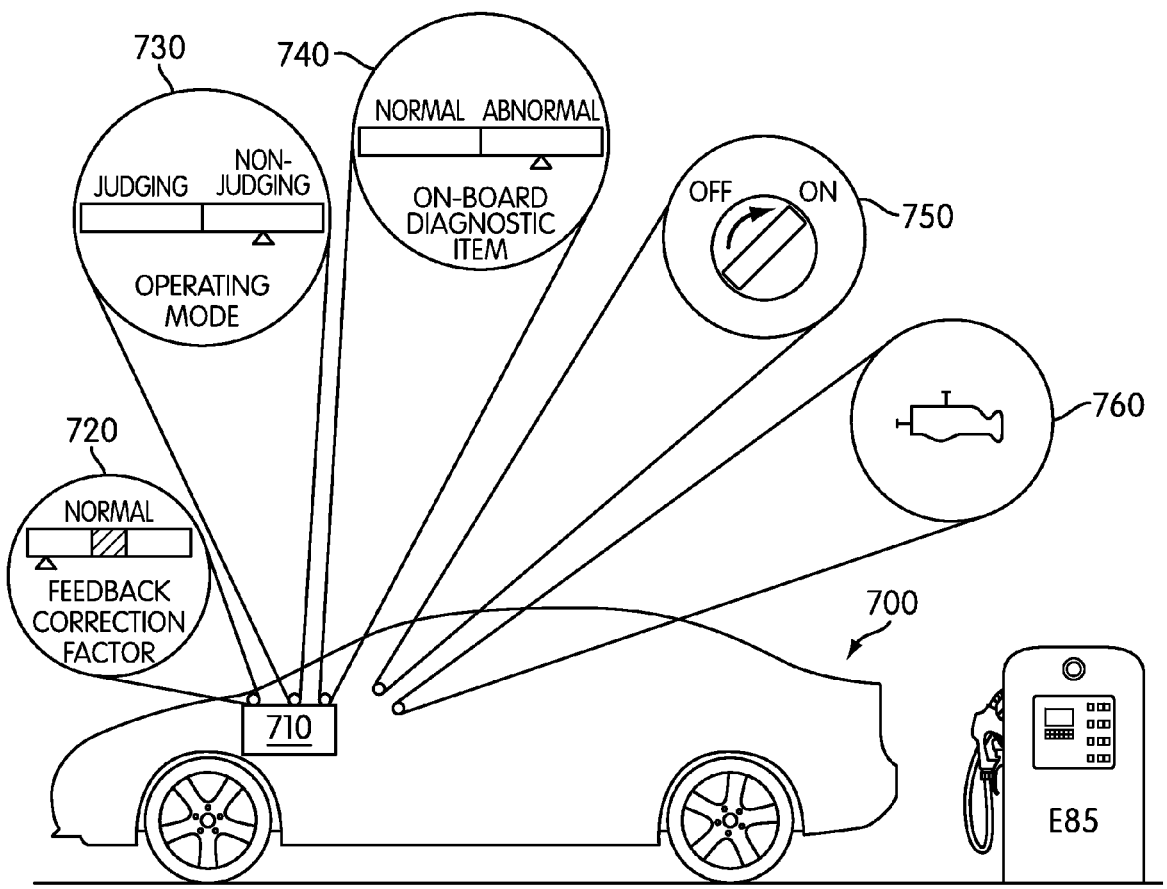
FIG. 7 is a schematic view of an embodiment of a vehicle that uses a feedback correction factor when determining whether to operate the vehicle in a judging or non-judging mode.

FIG. 7 shows a vehicle 700 that utilizes a feedback correction factor 720 for determining whether to judge the on-board diagnostic items. As can be seen in FIG. 7, when the ignition switch is placed in the on position 750, a large amount of ethanol fuel (E85) is injected into the engine in order to startup the vehicle 700. The electronic control unit 710 may sense a large amount of unburned fuel in the exhaust and determine that the air/fuel ratio is low. This may cause the feedback correction factor to be below a predetermined range 720. Since the feedback correction factor is below a predetermined range 720, the on-board diagnostic items may not be reliable. In this case, the vehicle may operate in a non-judging mode 730. Therefore, even though the on-board diagnostic item is determined to be abnormal 740, the malfunction indicator 760 is not activated. This may help prevent excessive activation of malfunction indicator 760 when mixed fuels are used in an engine during start-up.

Figure 8:
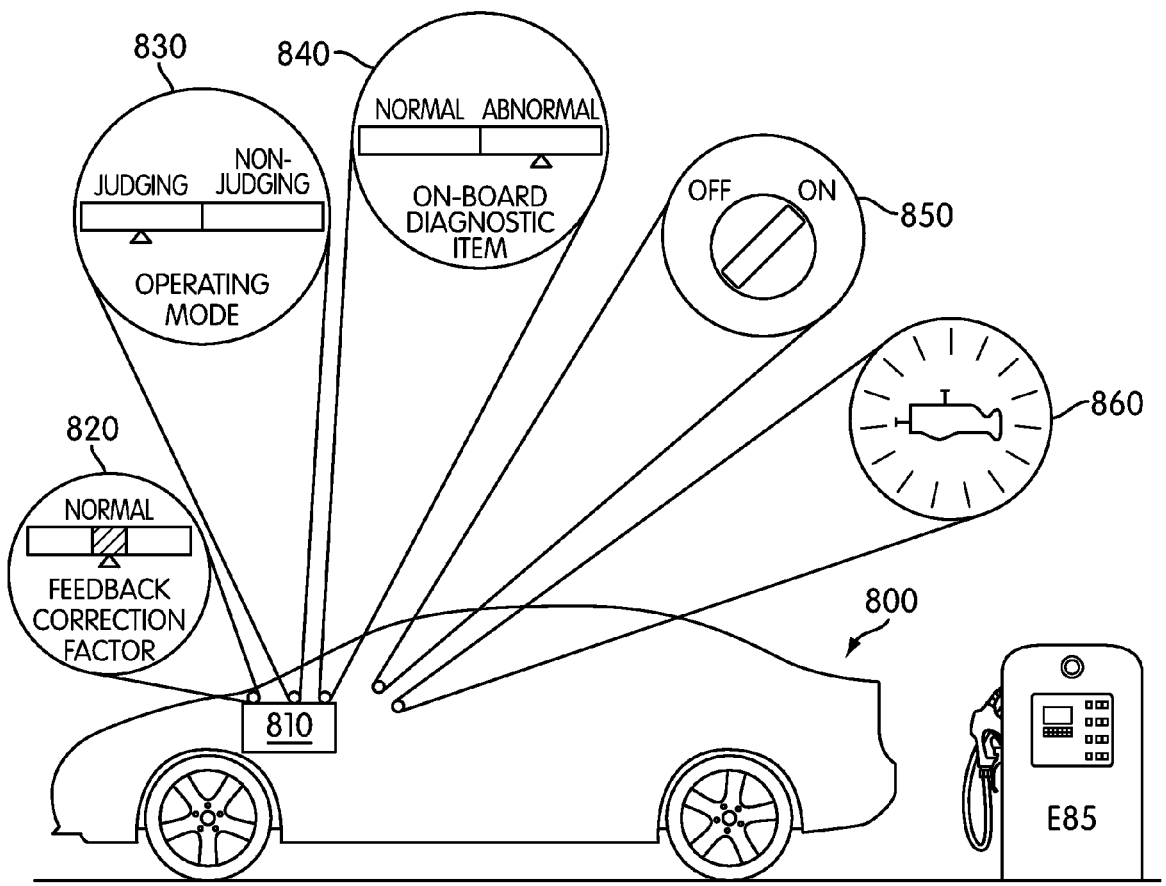
FIG. 8 is a schematic view of an embodiment of a vehicle that uses a feedback correction factor when determining whether to operate the vehicle in a judging or non-judging mode.

FIG. 8 shows a vehicle 800 at some time after the ignition switch being place in the on position 850. Since the engine is operating under normal conditions the electronic control unit 810 may determine that the current air/fuel ratio is near the ideal air/fuel ratio, and therefore the feedback correction factor may be within a predetermined range 820. Since the feedback correction factor may be within a predetermined range 820, the vehicle may operate in the judging mode 830. In other words, the system may judge the on-board diagnostic items to determine if there are any diagnostic problems. In this case, since on-board diagnostic item 840 is determined to be abnormal, the malfunction indicator 860 may be properly activated. This helps alert a driver to potential diagnostic issues in situations where the on-board diagnostic items can be trusted.

Figure 9:
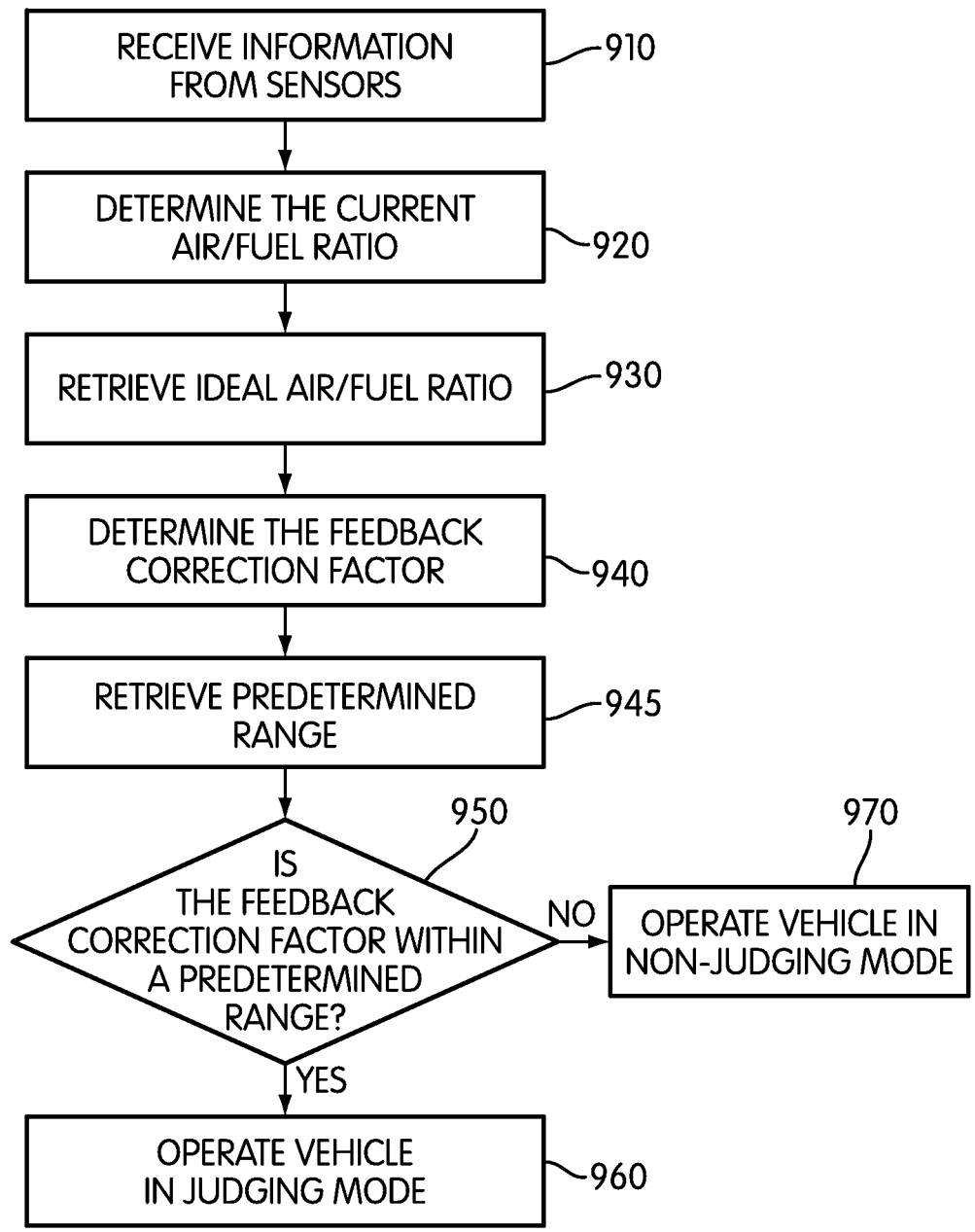
FIG. 9 is an embodiment of a method for considering a feedback correction factor when determining whether to operate the vehicle in a judging or non-judging mode.

FIG. 9 is an embodiment of a method for considering a feedback correction factor when determining whether to judge the on-board diagnostic items. In this embodiment, the following steps may be performed by the electronic control unit. However in some embodiments these steps may be performed by additional systems or devices associated with the electronic control unit and/or motor vehicle. For example, some of the following steps may be performed by the calculation units 230, 330 as shown in FIGS. 2 and 3. In addition, it will be understood that in other embodiments one or more of the following steps may be optional.

In step 910, the calculation unit 230, or the electronic control unit 10, may receive information from one or more sensors. In some embodiments, the calculation unit 230, or the electronic control unit, may receive an electronic signal from an oxygen sensor 220 as shown in FIG. 2. In some embodiments, the calculation unit 230, or electronic control unit, may receive an electronic signal from a fuel injector 200. In some embodiments, the calculation unit 230, or the electronic control unit, may receive an electronic signal from an air flow meter 210. The calculation unit 230, or the electronic control unit, may also receive an electronic signal from sensors not shown in FIG. 2, but which are known by those skilled in the art.

In step 920, the calculation unit 230, or the electronic control unit, may determine the current air/fuel ratio of the vehicle based on the information received in step 810.

In step 930, the calculation unit 330, or the electronic control unit, may retrieve the ideal air/fuel ratio stored in electronic memory, as shown in FIG. 3. In some embodiments, the ideal air/fuel ratio may be calculated while the process in FIG. 9 is being carried out. In those embodiments, the ideal air/fuel ratio may be based on the age of the vehicle and/or the degree of deterioration of certain parts.

In step 940, the calculation unit 330, or the electronic control unit, may determine the current correction feedback factor 340. In some embodiments, the current feedback correction factor 340 may be determined as shown in FIG. 3. In some embodiments, the calculation unit 330 or the electronic control unit 10 may divide the current air/fuel ratio calculated in step 920 by the ideal air/fuel ratio determined or retrieved in step 930.

In step 945, the electronic control unit may retrieve the predetermined range for the correction feedback factor from electronic memory. The predetermined range may be stored in the electronic control unit, or any other location that is capable of storing electronic memory.

In step 950, the electronic control unit may determine if the feedback correction factor is within the predetermined range. Generally, the predetermined range may be defined by any two numerical values. In some embodiments, the predetermined range may be 0.0 to 2.0. In other embodiments, the predetermined range may be 0.5 to 1.5. In one embodiment, the predetermined range may be 0.9 to 1.1. If the feedback correction factor is within a predetermined acceptable range, the electronic control unit may proceed to step 960. In step 960, the system enters the judging mode. This condition signifies that the engine parameters are such that the on-board diagnostic items can be trusted. In some cases, preconditioning the judgment of the on-board diagnostic items in this manner may help decrease the number of false alarms. If the feedback correction factor is outside of an acceptable range, the electronic control unit may proceed to step 970, where the electronic control unit enters the non-judging mode. In this mode, the on-board diagnostic items are not judged to detect potential diagnostic problems. Moreover, in this non-judging mode, the electronic control unit is prevented from activating any malfunction indicators. In this manner, erroneous activation of a malfunction indicator due to starting up an engine using ethanol may be avoided.

In some embodiments, the feedback correction factor can be compared with a threshold value, rather than a range of values, during step 950. In some embodiments, the electronic control unit may determine whether the feedback correction factor is above or below a predetermined value. For example, the electronic control unit may determine whether the feedback correction factor is above 0.0. In other embodiments, the electronic control unit may determine whether the feedback correction factor is above 0.5, or above 0.9. In some embodiments, the electronic control unit may determine whether the feedback correction factor is below a certain value. For example, the electronic control unit may determine whether the feedback correction factor is below 2.0, or below 1.5, or below 1.1.

Figure 10:
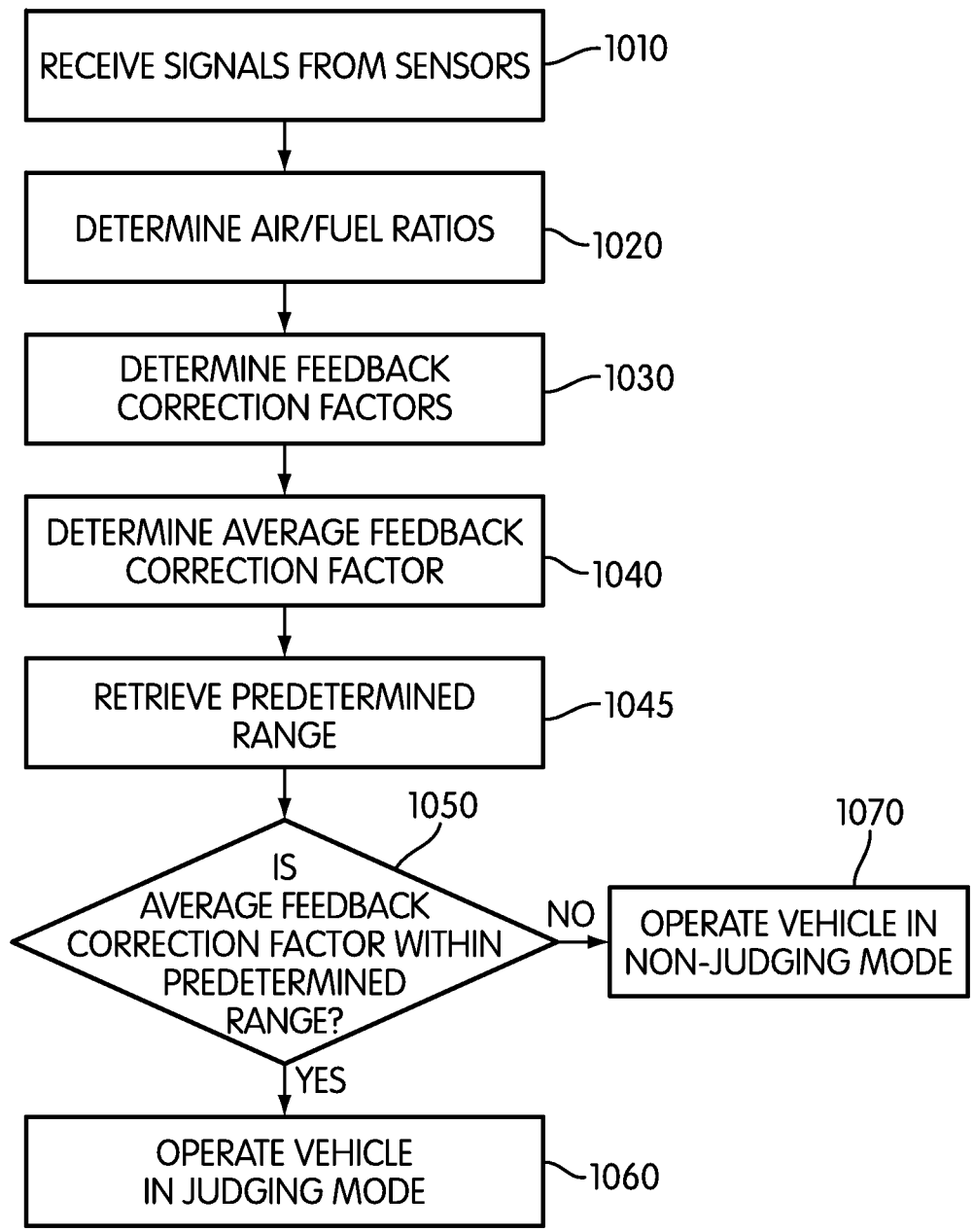
FIG. 10 is an embodiment of a method for considering an average feedback correction factor when determining whether to operate the vehicle in a judging or non-judging mode.

FIG. 10 is an embodiment of a method for considering an average feedback correction factor when determining whether to judge on-board diagnostic items. In this embodiment, the following steps may be performed by the electronic control unit. However in some embodiments these steps may be performed by additional systems or devices associated with the electronic control unit and/or motor vehicle. For example, some of the following steps may be performed by the calculation unit 230, 330 as shown in FIGS. 2 and 3. In addition, it will be understood that in other embodiments one or more of the following steps may be optional.

The process shown in FIG. 10 is similar to the process shown in FIG. 9, except that the process shown in FIG. 10 may calculate two or more feedback correction factors in order to determine an average feedback correction factor. The average feedback correction factor may then be used to determine whether to operate the vehicle in judging or non-judging mode. Using an average feedback correction factor increases the probability that the vehicle is in a state wherein the on-board diagnostic items can be judged. For example, this embodiment allows the on-board diagnostic items to be trusted even though one of the calculated feedback correction factors is outside a predetermined range. This reduces the chances that on-board diagnostic items will not be judged based on a feedback correction factor that is temporarily high or low.

In step 1010 of the process shown in FIG. 10, the calculation unit 230, or the electronic control unit, may receive at least a first and second signal from one or more sensors. In some embodiments, the calculation unit 230, or the electronic control unit, may receive more than two signals from the same sensor, or more than two signals from multiple sensors. In other embodiments, the calculation unit 230, or the electronic control unit, may continuously receive signals from sensors. In some embodiments, the calculation unit 230, or the electronic control unit, may receive a signal at periodic intervals. For example, the calculation unit 230, or the electronic control unit, may receive the second signal five seconds after the first signal is received. However, one skilled in the art would recognize that time periods of less than or greater than 5 seconds are also possible. In some embodiments, the calculation unit 230, or the electronic control unit, may receive all the signals from the same sensor. In some embodiments, the calculation unit 230, or the electronic control unit, may receive all the signals from more than one sensor. In some embodiments, the calculation unit 230, or the electronic control unit, may receive some signals from one sensor and some signals from one or more other sensors.

In step 1020, the calculation unit 230, or the electronic control unit, may use the signals received in step 910 to determine a first and second air/fuel ratio.

In step 1030, the calculation unit 330, or the electronic control unit, may determine at least a first and second feedback correction factor. In some embodiments, the second feedback correction factor may be determined five seconds after the first feedback correction factor is determined. However, one skilled in the art would recognize that time periods of less than or greater than five seconds are also possible. In some embodiments, the feedback correction factor is continuously being determined.

In step 1040, the electronic control unit may determine an average feedback correction factor. Averaging at least a first and second feedback correction factor over a period of time increases the stability of the on-board diagnostic system by ensuring that the average value over time is within a predetermined range.

Next, in step 1045, the electronic control unit may retrieve the predetermined range for the correction feedback factor from electronic memory. The predetermined range may be stored in the electronic control unit, or any other location that is capable of storing electronic memory.

In step 1050, the electronic control unit may determine if the average feedback correction factor is within the predetermined range. Generally, the predetermined range can be defined by any two numerical values. In some embodiments, the predetermined range may be 0.0 to 2.0. In other embodiments, the predetermined range may be 0.5 to 1.5. In one embodiment, the predetermined range may be 0.9 to 1.1. If the feedback correction factor is within a predetermined acceptable range, the electronic control unit may proceed to step 1060, and may judge the on-board diagnostic items. If the average feedback correction factor is outside a predetermined range, the electronic control unit may proceed to step 1070 and may not judge the on-board diagnostic items.

In some embodiments, the feedback correction factor can be compared with a threshold value, rather than a range of values, during step 1050. In some embodiments, the electronic control unit may determine whether the feedback correction factor is above or below a predetermined value. For example, the electronic control unit may determine whether the feedback correction factor is above 0.0. In other embodiments, the electronic control unit may determine whether the feedback correction factor is above 0.5, or above 0.9. In some embodiments, the electronic control unit may determine whether the feedback correction factor is below a certain value. For example, the electronic control unit may determine whether the feedback correction factor is below 2.0, or below 1.5, or below 1.1.

Figure 11:
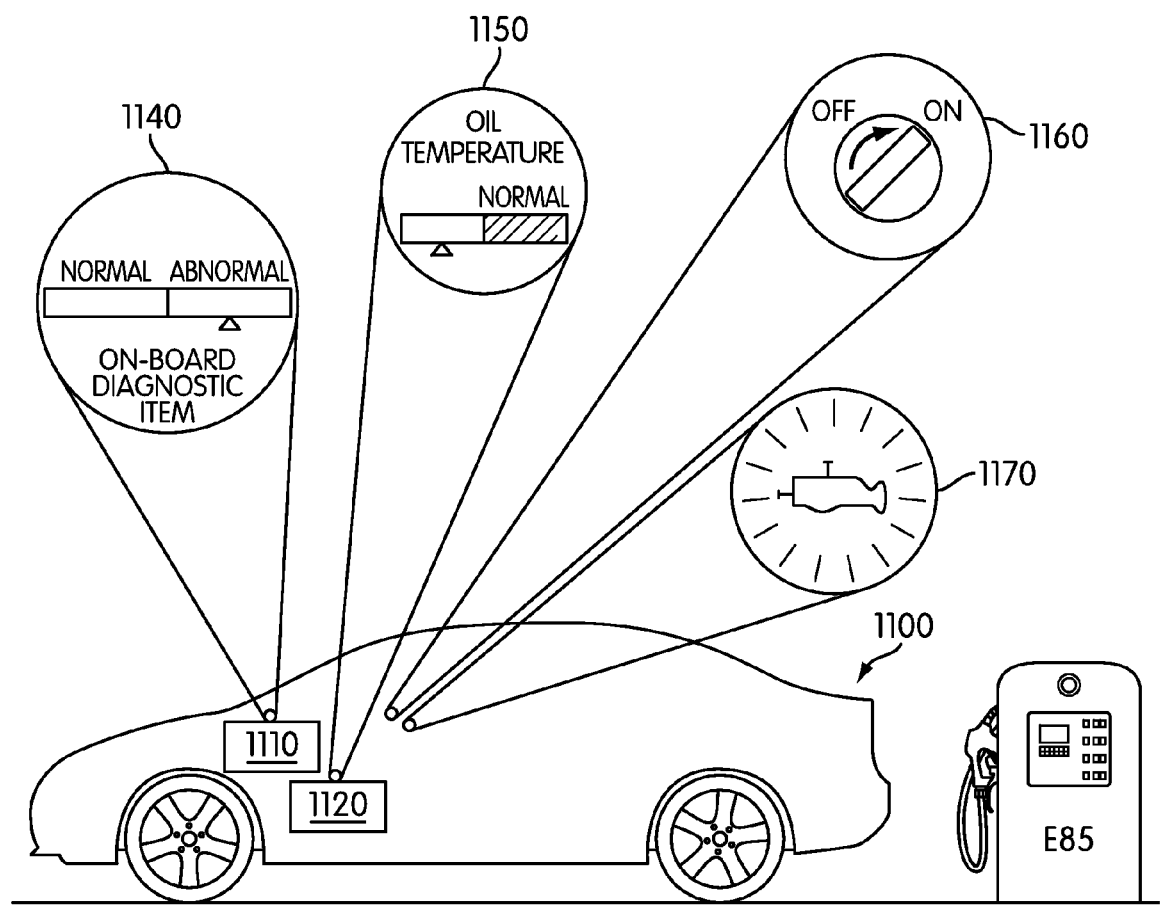
FIG. 11 is a schematic view of an embodiment of a vehicle during start up.
Figure 12:
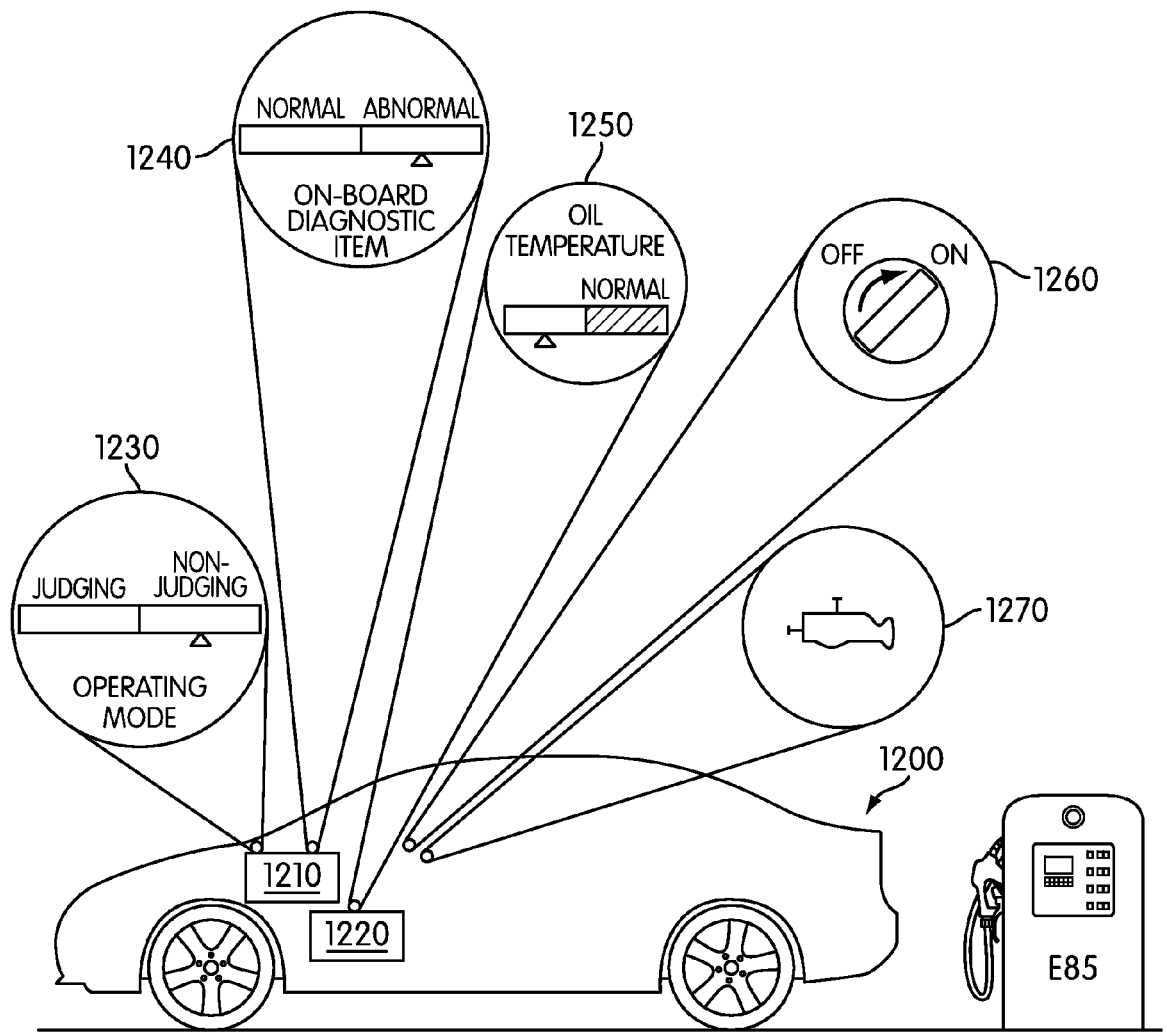
FIG. 12 is a schematic view of an embodiment of a vehicle that considers engine oil temperature when determining whether to operate the vehicle in a judging or non-judging mode.
Figure 13:
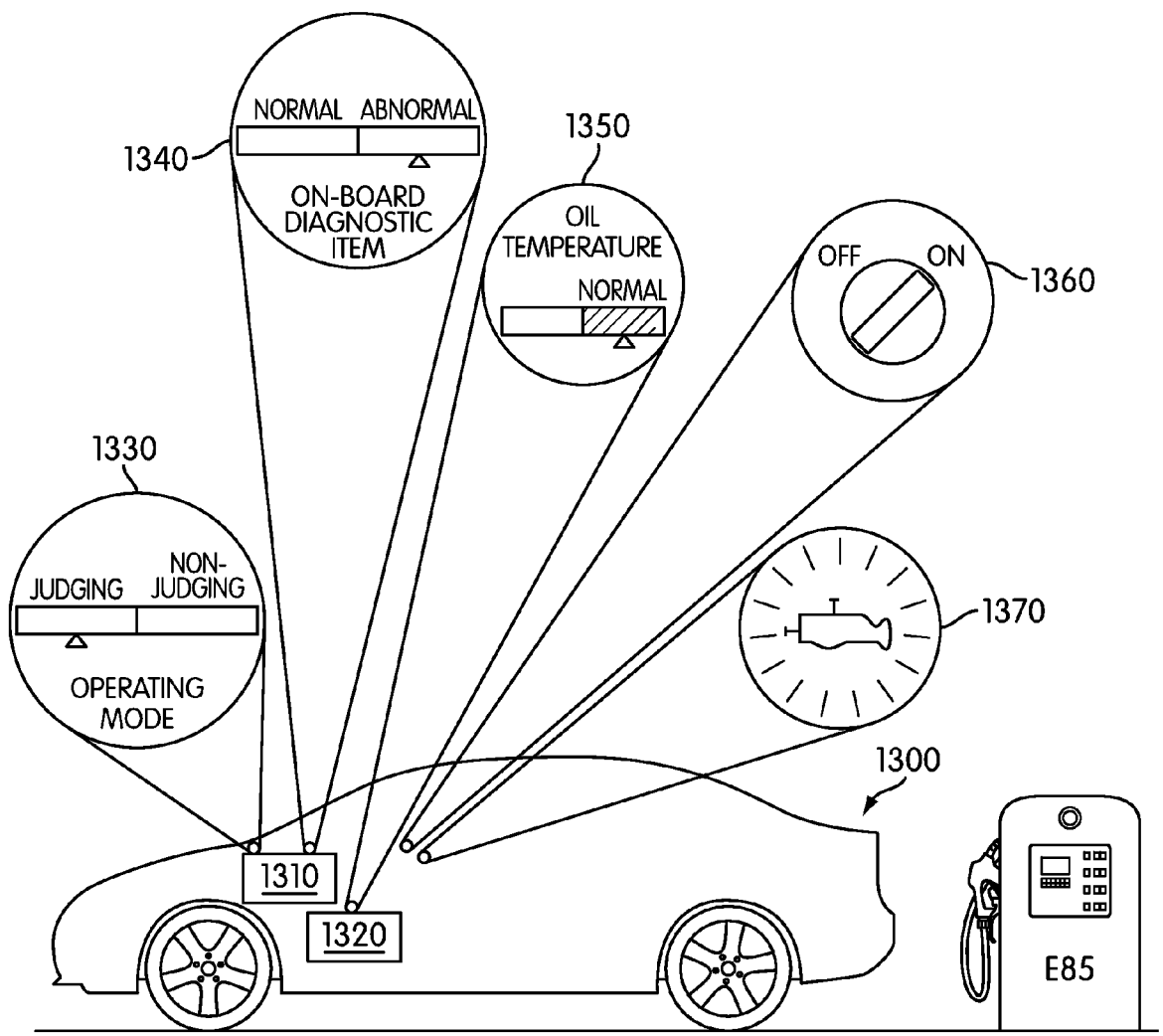
FIG. 13 is a schematic view of another embodiment of a vehicle that considers engine oil temperature when determining whether to operate the vehicle in a judging or non-judging mode.

FIGS. 11-13 describe further provisions for controlling the on-board diagnostic system. In these embodiments, the electronic control unit may consider the engine oil temperature in determining whether to operate in the judging mode or the non-judging mode. In some embodiments, the electronic control unit may compare the engine oil temperature received from sensors with a predetermined temperature. In other embodiments, the electronic control unit may compare a predicted engine oil temperature with a predetermined temperature. A predicted oil temperature can be determined using any methods known in the art for determining or calculating a predicted oil temperature according to various other operating parameters. Examples of different operating parameters that may be used to predict the engine oil temperature include, but are not limited to: various engine parameters, ambient temperature, water and/or coolant levels, as well as any other operating parameters. In other words, in some cases, the predicted engine oil temperature may be a calculated value, where the calculation uses various other operating parameters for input. The predetermined temperature may be related to an engine oil temperature that is warm enough to allow for the evaporation of ethanol fuel (E85). This helps ensure that any impurities detected by the on-board diagnostic system in the exhaust are not caused by the presence of unevaporated ethanol fuel (E85). In these situations, the on-board diagnostic items may be reliable and can therefore be judged to determine possible diagnostic issues. These embodiments may operate in conjunction with, or independently from, the previously described embodiments.

FIG. 11 shows an embodiment of a vehicle 1100 where the electronic control unit 1110 does not consider the engine oil temperature 1150 when determining whether to judge on-board diagnostic items. As the ignition is turned to the on position 1160, the engine oil temperature may be below a predetermined temperature 1150. Since on-board diagnostic item is determined to be abnormal 1140, the malfunction indicator may activate 1170. Since the engine was just started, many of the engine's parameters are not yet in their normal operating range. Because of this, the on-board diagnostic item may only temporarily have an abnormal value 1140. This results in an unnecessary activation of the malfunction indicator 1170.

FIG. 12 is a schematic view of an embodiment of a vehicle 1200 that considers engine oil temperature when determining whether to operate in a judging mode or a non-judging mode. As the ignition is turned to the on position 1260, the engine oil temperature, or predicted engine oil temperature, may be below a predetermined temperature 1250. Since the engine oil temperature, or predicted engine oil temperature, may be below a predetermined temperature 1250, the vehicle may operate in a non-judging mode 1230. Thus, even though the electronic control unit 1210 determines that an on-board diagnostic item is abnormal 1240, the malfunction indicator 1270 is not activated. This helps prevent unnecessary activation of the malfunction indicator 1270 when many parameters of the engine 1220 are not yet operating in their normal range.

FIG. 13 is a schematic view of another embodiment of a vehicle 1300 that considers engine oil temperature when determining whether to operate in a judging mode or a non-judging mode. FIG. 13 shows a vehicle 1300 some time after the ignition switch has been placed in the on position 1360, such that the engine 1320 is operating under normal conditions. The engine oil temperature, or predicted engine oil temperature, may be above a predetermined temperature 1350. Since the engine oil temperature, or predicted engine oil temperature, is above a predetermined temperature 1350, the vehicle may operate in the judging mode 1330. Since, the electronic control unit 1310 determines that an on-board diagnostic item is abnormal 1340, the malfunction indicator 1370 may be activated.

In some embodiments, the determination of whether to judge the on-board diagnostic items may be based on whether the engine oil temperature, or predicted engine oil temperature, is within a predetermined range. For example, the predetermined range may be between 90 F and 130 F. In other embodiments, the determination of whether to judge the on-board diagnostic items may be based on whether the engine oil temperature, or predicted engine oil temperature, is above a predetermined temperature. For example, the predetermined temperature may be 90 F.

Figure 14:
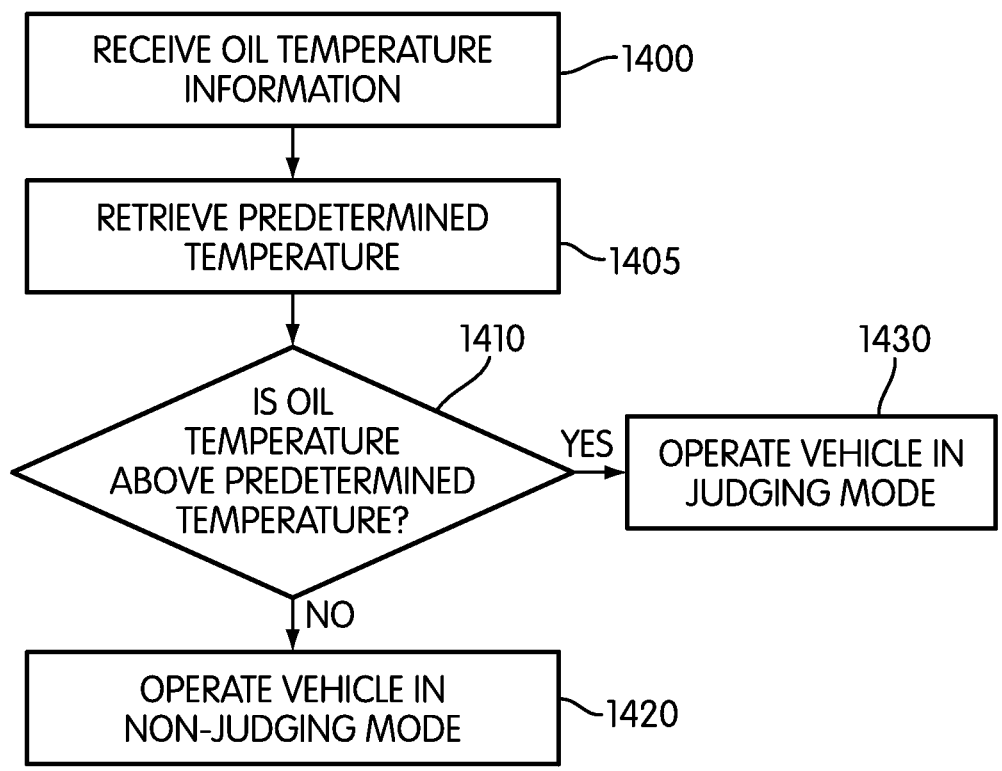
FIG. 14 is an embodiment of a method for considering engine oil temperature when determining whether to operate the vehicle in a judging or non-judging mode.

FIG. 14 is an embodiment of a method for considering engine oil temperature when determining whether to judge on-board diagnostic items. In this embodiment, the following steps may be performed by the electronic control unit. However, in some embodiments these steps may be performed by additional systems or devices associated with the electronic control unit and/or motor vehicle. In addition, it will be understood that in other embodiments one or more of the following steps may be optional.

In step 1400, the electronic control unit may receive oil temperature information. In some cases, the oil temperature information may be received from an engine oil temperature sensor. For example, electronic control unit may receive an electronic signal from engine oil temperature sensor 18 in FIG. 1. In other cases, the oil temperature information may be predicted, or calculated, based on other engine parameters. For example, the engine oil temperature may be predicted using signals from a mass flow meter, a fuel injector, an oxygen sensor, or any other parameter from which the engine oil temperature may be derived or predicted. In other cases, any other method known in the art for predicting oil temperature based on other operating parameters of a vehicle and/or engine can be used.

In step 1405, the electronic control unit may retrieve a predetermined temperature stored in electronic memory. In some embodiments, the electronic control unit may retrieve a range of temperature from electronic memory. The predetermined temperature, or predetermined range of temperature, may be stored in the electronic control unit, or any other location that is capable of storing electronic memory.

In step 1410, the electronic control unit may determine whether the current engine oil temperature signal, or predicted engine oil temperature, received in step 1400 is above the predetermined temperature. For example, the electronic control unit may determine whether the engine oil temperature, or predicted engine oil temperature, is above 90 F, corresponding to a temperature at which the ethanol fuel will evaporate. In one embodiment, the electronic control unit may determine whether the engine oil temperature, or predicted engine oil temperature, is above 80 F. In some embodiments, the predetermined temperature may be related to an engine oil temperature that is warm enough to allow for the evaporation of ethanol fuel (E85). This helps ensure that any impurities detected by the on-board diagnostic system in the exhaust are not caused by the presence of unevaporated ethanol fuel (E85).

In other embodiments, the electronic control unit may determine whether the current engine oil temperature signal, or predicted engine oil temperature, is within a predetermined range. In some embodiments, the predetermined range of engine oil temperature may be between 70 F and 120 F.

In some embodiments, the temperature at which ethanol fuel evaporates may change as the vehicle gets older. The stored temperature, or temperature range, may take into account various parameters of the engine in order to determine the appropriate predetermined temperature. For example, the predetermined temperature, or predetermined temperature range, may change according to the age of the vehicle, current load of the vehicle, type of fuel the vehicle is using, current speed of the engine, as well as other factors.

In some embodiments, if the current engine oil temperature, or predicted engine oil temperature, is not above a predetermined temperature, the electronic control unit may proceed to step 1420 and may enter the non-judging mode. In some embodiments, if the current engine oil temperature, or predicted engine oil temperature, is not within a predetermined range, the electronic control unit 10 may proceed to step 1420 and may enter the non-judging mode.

In some embodiments, if the current engine oil temperature, or predicted engine oil temperature, is above a predetermined temperature, the electronic control unit may proceed to step 1430 and enter the judging mode. In some embodiments, if the current engine oil temperature, or predicted engine oil temperature, is within a predetermined range, the electronic control unit may proceed to step 1430 and enter the judging mode.

Figure 15:
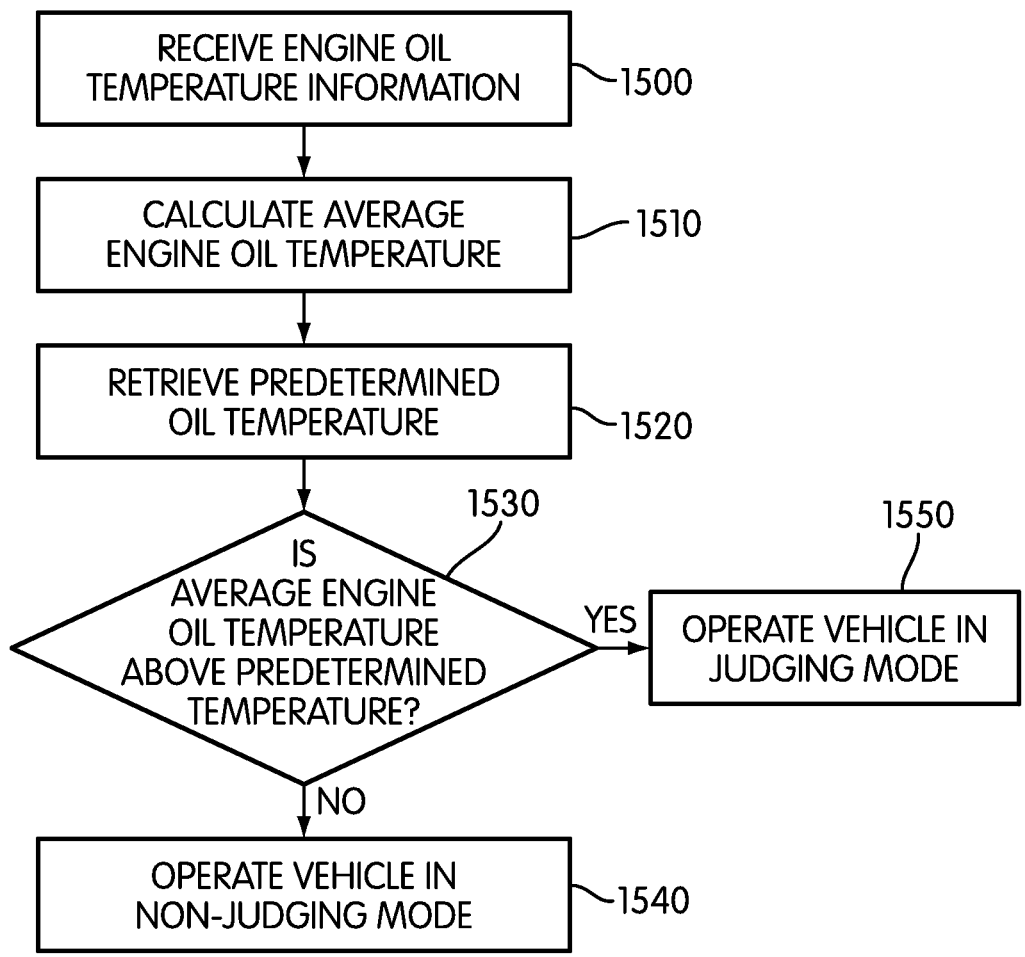
FIG. 15 is an embodiment of a method for considering average engine oil temperature when determining whether to operate the vehicle in a judging or non-judging mode.

FIG. 15 is an embodiment of a method for considering average engine oil temperature when determining whether to judge on-board diagnostic items. This embodiment is similar to the embodiment shown in FIG. 14, except that more than one engine oil temperature, or predicted engine oil temperature, is averaged and considered when determining whether to judge the on-board diagnostic items. Averaging the value of the engine oil temperature, or predicted engine oil temperature, over a period of time increases the accuracy of determining whether or not to judge the on-board diagnostic items based on engine oil temperature. By averaging the engine oil temperature, or predicted engine oil temperature, the judgments of the on-board diagnostic items may still be trusted even if the engine oil temperature may be temporarily low.

In step 1500, the electronic control unit may receive engine oil temperature information. In some embodiments, the electronic control unit may receive a signal from one or more engine oil temperature sensors. The electronic control unit may receive each engine oil temperature sensor at periodic intervals. In some embodiments, the electronic control unit may receive the second oil temperature five seconds after the first oil temperature is received. However, one skilled in the art would recognize that time periods of less than or greater than 5 seconds are also possible. In some embodiments, the electronic control unit may continuously receive signals from engine oil temperature sensors. In some cases, the electronic control unit may receive engine oil temperature signals from the same temperature sensor. In other cases, the electronic control unit may receive engine oil temperature signals from more than one temperature sensor. In still other cases, the electronic control unit may receive engine oil temperature signals from some combination of the same temperature sensor and/or various other temperature sensors.

In other embodiments, the electronic control unit may predict the engine oil temperature based on various engine parameters in step 1500. For example, the engine oil temperature may be predicted using signals from a mass flow meter, a fuel injector, an oxygen sensor, or any other parameter from which the engine oil temperature may be derived or predicted.

In step 1510, the electronic control unit may average the engine oil temperature signals received in step 1500. In some embodiments, other electronic components may average the engine oil temperature signals received in step 1500. In other embodiments, the electronic control unit in step 1510 may average the predicted engine oil temperatures calculated in step 1500.

In step 1520, the electronic control unit may retrieve a predetermined temperature stored in electronic memory. In some embodiments, the electronic control unit may retrieve a range of temperature from electronic memory. The predetermined temperature, or predetermined range of temperature, may be stored in the electronic control unit, or any other location that is capable of storing electronic memory.

In step 1530, the electronic control unit may determine whether the average engine oil temperature is above a predetermined temperature. For example, the electronic control unit may determine whether the average engine oil temperature is above 90 F, corresponding to a normal operating temperature of the engine. In one embodiment, the electronic control unit may determine whether the average engine oil temperature is above 80 F. Other temperatures may also be used to determine that the engine oil is warm enough to allow for the evaporation of ethanol fuel.

In some embodiments, the electronic control unit may determine if the average engine oil temperature is near normal operating temperature corresponding to a temperature at which the ethanol fuel will evaporate. In some embodiments, the electronic control unit may determine if the average oil temperature is within a predetermined range corresponding to a temperature at which the ethanol fuel will evaporate. For example, the range of normal operating temperature for the engine oil may be between 70 F and 120 F.

In some embodiments, the normal operating temperature, or range of temperature, may change as the vehicle gets older. In some embodiments, the average current engine oil temperature may be compared to a temperature, or temperature range, that has been stored in electronic memory. The stored temperature, or temperature range, may take into account various parameters of the engine in determining if the current temperature corresponds to a temperature at which the ethanol fuel will evaporate. For example, the predetermined temperature, or temperature range, may change according to the age of the vehicle, current load of the vehicle, type of fuel the vehicle is using, current speed of the engine, as well as other factors.

In some embodiments, if the electronic control unit determines that the average engine oil temperature is above the predetermined temperature, the electronic control unit may proceed to step 1550 and enter the judging mode. In some embodiments, if the electronic control unit determines the average engine oil temperature is within a predetermined range of temperature, the electronic control unit may proceed to step 1550 and enter the judging mode.

In some embodiments, if the electronic control unit determines that the average engine oil temperature is below the predetermined temperature, the electronic control unit may proceed to step 1540 and enter the non-judging mode. In some embodiments, if the electronic control unit determines the average engine oil temperature is not within a predetermined range of temperature, the electronic control unit may proceed to step 1540 and enter the non-judging mode.

Figure 16:
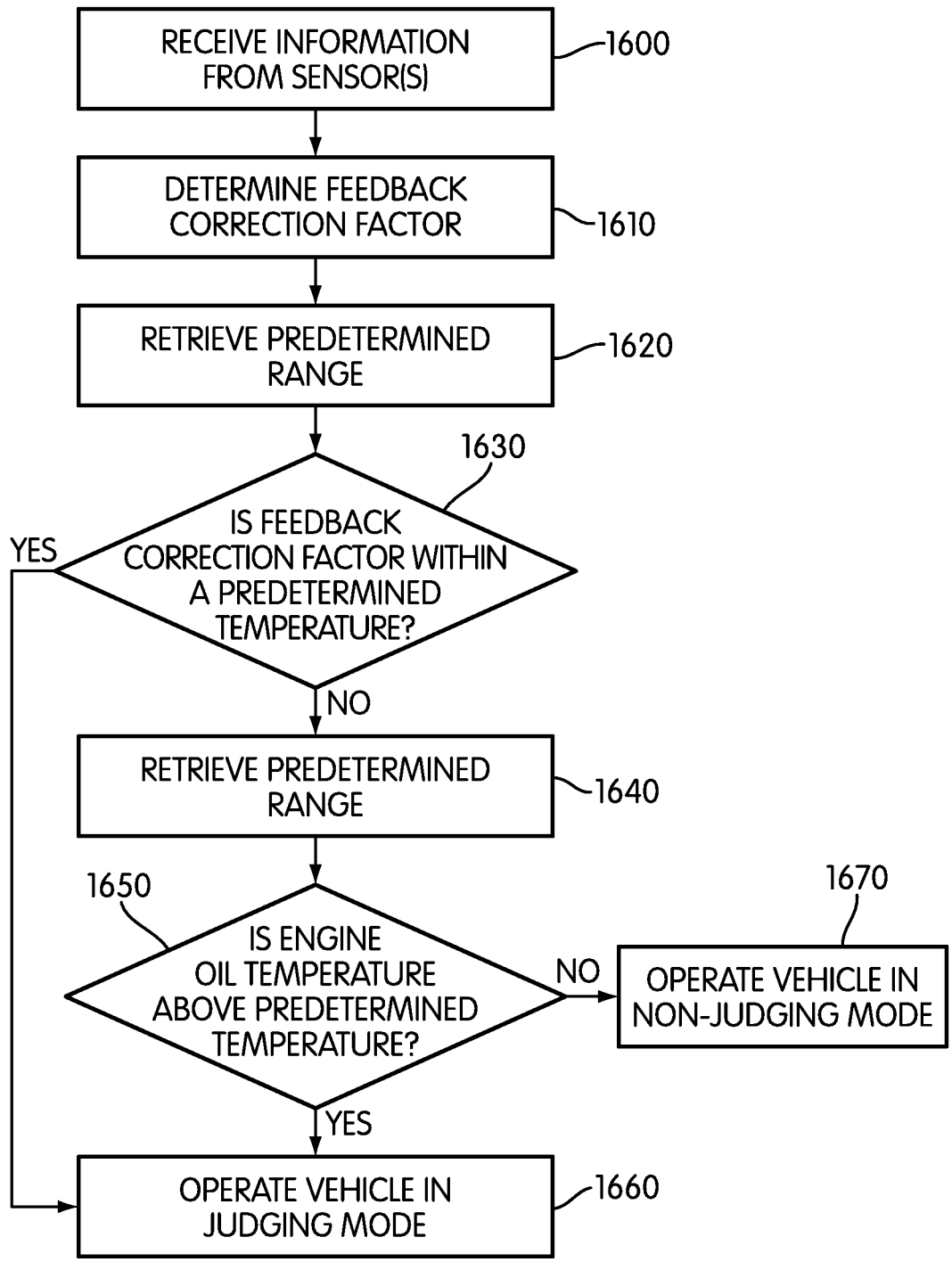
FIG. 16 is an embodiment of a method for considering feedback correction factor and engine oil temperature when determining whether to operate the vehicle in a judging or non-judging mode.

FIG. 16 is an embodiment of a method for considering feedback correction factor and engine oil temperature when determining whether to judge the on-board diagnostic items.

In this embodiment, the following steps may be performed by the electronic control unit. However, in some embodiments these steps may be performed by additional systems or devices associated with the electronic control unit and/or motor vehicle. In addition, it will be understood that in other embodiments one or more of the following steps may be optional.

FIG. 16 describes a process that considers both the feedback correction factor as well as the current engine oil temperature, or predicted engine oil temperature, when determining whether to operate the vehicle in judging or non-judging mode. In step 1600, the electronic control unit may receive information from various sensors. In some embodiments, the electronic control unit may receive information as shown in FIG. 2. In some embodiments, the calculation unit 230 may receive information from sensors as shown in FIG. 2. In some embodiments, the electronic control unit or calculation unit may receive signals from engine oil temperature sensors. In other embodiments, the electronic control unit or calculation unit may predict the engine oil temperature from other engine parameters.

In step 1610, the electronic control unit may determine the feedback correction factor. In some embodiments, the calculation unit 330 may determine the feedback correction factor as shown in FIG. 3. In some embodiments, the electronic control unit or calculation unit may determine the average feedback correction factor.

In step 1620, the electronic control unit may retrieve the predetermined range for the correction feedback factor from electronic memory. The predetermined range may be stored in the electronic control unit, or any other location that is capable of storing electronic memory.

In step 1630, the electronic control unit may determine whether the current feedback correction factor, or average feedback correction factor, is within a predetermined range. In one embodiment, if the feedback correction factor, or average feedback correction factor, is outside a predetermined normal operating range, the electronic control unit proceeds to step 1640. In some embodiments, if the feedback correction factor, or average feedback correction factor, is within a predetermined normal operating range, the electronic control unit may proceed to step 1660 and enters the judging mode.

In step 1640, the electronic control unit may retrieve the predetermined temperature from electronic memory. The predetermined temperature may be stored in the electronic control unit, or any other location that is capable of storing electronic memory. In some embodiments, the electronic control unit may retrieve a predetermined range of temperature stored in electronic memory.

In step 1650, the electronic control unit may consider the current engine oil temperature, predicted engine oil temperature, or average engine oil temperature, when determining whether to trust the judgments of the on-board diagnostic system.

In some embodiments, the electronic control unit may determine whether the current engine oil temperature, predicted engine oil temperature, or average engine oil temperature, is within a predetermined normal operating range. In one embodiment, if the engine oil temperature, predicted engine oil temperature, or average engine oil temperature, is outside a predetermined normal operating range, the electronic control unit may proceed to step 1670 and enter the non-judging mode. In some embodiments, if the engine oil temperature, predicted engine oil temperature, or average engine oil temperature, is within a predetermined normal operating range, the electronic control unit may proceed to step 1660 and enter the non-judging mode.

In some embodiments, the electronic control unit may determine whether the current engine oil temperature, predicted engine oil temperature, or average engine oil temperature, is above or below a predetermined temperature. In one embodiment, if the engine oil temperature, predicted engine oil temperature, or average engine oil temperature, is above a predetermined temperature, then the electronic control unit may proceed to step 1660 and enter the judging mode. In one embodiment, if the engine oil temperature, predicted engine oil temperature, or average engine oil temperature, is below a predetermined temperature, then the electronic control unit may proceed to step 1670 and enter the non-judging mode.

It is possible that errors can occur in the monitoring of the air/fuel ratio of an engine. This can lead to an erroneous calculation of the feedback correction factor. In order to overcome these possible errors, the decision to trust the judgment of the on-board diagnostic system can also be based on the oil temperature in addition to the feedback correction factor. This allows the judgment of the on-board diagnostic system to be trusted if the engine oil temperature, or predicted engine oil temperature, is above a predetermined temperature, even if the feedback correction factor is outside a predetermined range due to monitoring or calculation errors.

In describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied.

While various embodiments have been described, the description is intended to be exemplary, rather than limiting and it will be apparent to those of ordinary skill in the art that many more embodiments and implementations are possible. Also, various modifications and changes may be made within the scope of the attached claims.

What is claimed is:

1. A method of controlling an on-board diagnostic system of a motor vehicle, the method comprising:
   receiving, by an electronic control unit, a signal from at least one sensor relating to a first air/fuel ratio of the engine;
   determining, by the electronic control unit, a first air/fuel ratio;
   calculating, by the electronic control unit, a feedback correction factor by dividing the first air/fuel ratio by an ideal air/fuel ratio;
   retrieving, by the electronic control unit, a predetermined range associated with the feedback correction factor, wherein the electronic control unit is electronically connected to an on-board diagnostic system;
   entering, by the on-board diagnostic system, a judging mode if the feedback correction factor is within the predetermined range, wherein the judging mode includes judging at least one on-board diagnostic item to determine whether a diagnostic problem is occurring; and
   entering, by the on-board diagnostic system, a non-judging mode if the feedback correction factor is outside the predetermined range, wherein the non-judging mode includes ignoring at least one on-board diagnostic item and preventing a malfunction indicator from being activated.

2. The method of claim 1, wherein the predetermined range includes values between 0.5 and 1.5.

3. The method of claim 1, wherein the predetermined range includes values between 0.9 and 1.1.

4. The method of claim 1, wherein the on-board diagnostic system enters a judging mode if the feedback correction factor is below a threshold value.

5. The method of claim 1, wherein entering, by the on-board diagnostic system, the judging mode includes allowing a malfunction indicator to be activated based on the at least one on-board diagnostic item.

6. The method of claim 1, wherein the feedback correction factor is an average feedback correction factor.

7. The method of claim 1, further comprising:
determining, by the electronic control unit, a current engine oil temperature;
retrieving, by the electronic control unit, a predetermined engine oil temperature;
entering, by the on-board diagnostic system, a judging mode if the current engine oil temperature is above the predetermined engine oil temperature, wherein the judging mode includes judging at least one on-board diagnostic item to determine whether a diagnostic problem is occurring; and
entering, by the on-board diagnostic system, a non-judging mode if the current engine oil temperature is below the predetermined engine oil temperature, wherein the non-judging mode includes ignoring at least one on-board diagnostic item.

8. A method of controlling a motor vehicle, the method comprising:
receiving, by an electronic control unit, information from at least one sensor;
determining, by the electronic control unit, an average engine oil temperature over a period of time based on the information received from the sensor;
retrieving, by the electronic control unit, a predetermined engine oil temperature, wherein the electronic control unit is electronically connected to an on-board diagnostic system;
entering, by the on-board diagnostic system, a judging mode if the average engine oil temperature is above the predetermined engine oil temperature, wherein the judging mode includes judging at least one on-board diagnostic item to determine whether a diagnostic problem is occurring; and
entering, by the on-board diagnostic system, a non-judging mode if the average engine oil temperature is below the predetermined engine oil temperature, wherein the non-judging mode includes ignoring at least one on-board diagnostic item.

9. The method of claim 8, wherein the predetermined engine oil temperature is in the range between 70 degrees and 110 degrees.

10. The method of claim 8, wherein the predetermined engine oil temperature is approximately 90 F.

11. The method of claim 8, further comprising:
receiving, from an engine oil temperature sensor, a plurality of engine oil temperatures at periodic intervals.

12. An on-board diagnostic system for a motor vehicle, the system comprising:
an electronic control unit;
at least one sensor electronically connected to the electronic control unit, wherein the sensor is capable of sending at least one signal to the electronic control unit;
an on-board diagnostic system electronically connected to the electronic control unit, wherein the on-board diagnostic system is configured to judge at least one on-board diagnostic item to determine if a diagnostic problem is occurring;
wherein the electronic control unit evaluates a first signal received from the at least one sensor related to an air/fuel ratio and a second signal received from the at least one sensor related to a predicted engine oil temperature, the electronic control unit comparing at least one of the first signal and the second signal to a predetermined range; and
wherein, the judgments of the at least one on-board diagnostic item are prohibited based on the evaluation by the electronic control unit that the at least one of the first signal and the second signal is outside of the predetermined range.

13. The system of claim 12, wherein the electronic control unit determines an engine oil temperature based on the second signal from the sensor, and wherein judgments of the on-board diagnostic items are prohibited if the engine oil temperature is below a predetermined temperature.

14. The system of claim 13, wherein the predetermined temperature is based on an age of the motor vehicle.

15. The system of claim 12, wherein the evaluation of the electronic control unit includes determining a feedback correction factor, and wherein judgments of the on-board diagnostic items are prohibited if the feedback correction factor is outside the predetermined range.

16. The system of claim 15, wherein the predetermined range is 0.9 to 1.1.

17. The system of claim 12, wherein the electronic control unit determines an engine oil temperature based on the second signal from the sensor, and wherein the evaluation by the electronic control unit includes averaging the engine oil temperature, and wherein judgments of the on-board diagnostic items are prohibited if the average engine oil temperature is below a predetermined value.

18. The system of claim 12, wherein the evaluation of the electronic control unit includes determining an average feedback correction factor, and wherein judgments of the on-board diagnostic items are prohibited if the average feedback correction factor is outside the predetermined range.

19. The system of claim 12, wherein the electronic control unit determines an engine oil temperature based on the second signal from the sensor, and wherein judgments of the on-board diagnostic items system are allowed if the engine oil temperature is above a predetermined value.

20. The system of claim 19, wherein the evaluation of the electronic control unit includes determining a feedback correction factor, and wherein the feedback correction factor is outside of the predetermined range, and wherein the judgments of the on-board diagnostic items are allowed since the engine oil temperature is above a predetermined value.

* * * * *